(12) United States Patent
Inglis et al.

(10) Patent No.: US 12,147,680 B2
(45) Date of Patent: Nov. 19, 2024

(54) METHODS OF ADMINISTERING METADATA FOR PERSISTENT STORAGE DEVICE

(71) Applicant: Daedalus Cloud LLC, Croton-on-Hudson, NY (US)

(72) Inventors: Stuart John Inglis, Hamilton (NZ); Sheridan John Lambert, Hamilton (NZ); Adam Gworn Kit Fleming, Hamilton (NZ); Matthew Sylvain Lazaro, Leamington (NZ)

(73) Assignee: Daedalus Cloud LLC, Croton-on-Hudson, NY (US)

( * ) Notice: Subject to any disclaimer, the term of this patent is extended or adjusted under 35 U.S.C. 154(b) by 30 days.

(21) Appl. No.: 18/085,248

(22) Filed: Dec. 20, 2022

(65) Prior Publication Data

US 2023/0195329 A1    Jun. 22, 2023

Related U.S. Application Data

(60) Provisional application No. 63/292,044, filed on Dec. 21, 2021.

(51) Int. Cl.
*G06F 3/06* (2006.01)
*G06F 11/10* (2006.01)

(52) U.S. Cl.
CPC ............ *G06F 3/0619* (2013.01); *G06F 3/064* (2013.01); *G06F 3/0662* (2013.01); *G06F 3/0683* (2013.01); *G06F 11/1076* (2013.01)

(58) Field of Classification Search
CPC ...... G06F 3/0619; G06F 3/064; G06F 3/0662; G06F 3/0683; G06F 11/1076
See application file for complete search history.

(56) References Cited

U.S. PATENT DOCUMENTS 9,779,268 B1    10/2017  Colgrove et al.
2020/0073818 A1*  3/2020  Inglis ................. G06F 12/0815

FOREIGN PATENT DOCUMENTS

EP        3617868 A1    3/2020

OTHER PUBLICATIONS

Xingbo Wu, Selfie: Co-locating Metadata and Data to Enable Fast Virtual Block Devices, May 26, 2015, SYSTOR (Year: 2015).*
May 9, 2023—Extended European Search Report—EP 22215190.4.
(Continued)

*Primary Examiner* — Ryan Bertram
(74) *Attorney, Agent, or Firm* — Ascenda Law Group, PC

(57) ABSTRACT

In some examples, there is provided a method for a storage controller to receive a request to write data at a virtual location, writing data at the next free physical location in sequence, writing metadata correlating the virtual location with the physical location at the physical location, and writing a counter at the physical location. The recorded metadata can be used to re-construct the mapping between a given physical location and its corresponding virtual location if the virtual block address is somehow lost. The recorded counter can be used to determine the most recently recorded mapping between the virtual location and physical location, thereby resolving any discrepancies between earlier recorded metadata.

15 Claims, 12 Drawing Sheets

(56) References Cited

OTHER PUBLICATIONS

Charles Manning: ""How Yaffs works : Yaffs"", Sep. 4, 2012 (Sep. 4, 2012), XP055442477, Retrieved from the Internet: URL: http://web.archive.org/web/20120904055647/http://www.yaffs.net:80/documents/how-yaffs-works.
Li Yameng et al: "Recovering missing data from YAFFS2", 2016 5th International Conference on Computer Science and Network Technology (ICCSNT), IEEE, Dec. 10, 2016 (Dec. 10, 2016), pp. 295-298, XP033227607, DOI: 10.1109/ICCSNT.2016.8070167.

* cited by examiner

FIG. 2

| | PHYSICAL LOCATION | | | | HEAD COUNTER | BLOCK COUNTER | STORAGE DEVICE METADATA |
|---|---|---|---|---|---|---|---|
| | 0 | 1 | 2 | 3 | | | |
| 200 | | | | | 0 | 0 | |
| 201 | Data: a / Metadata: h(a) Virtual location 6 Block counter 0 | | | | 1 | 1 | 6 → 0 |
| 202 | Data: a / Metadata: h(a) Virtual location 6 Block counter 0 | Data: b / Metadata: h(b) Virtual location 3 Block counter 1 | | | 2 | 2 | 6 → 0 <br> 3 → 1 |
| 203 | Data: a / Metadata: h(a) Virtual location 6 Block counter 0 | Data: b / Metadata: h(b) Virtual location 3 Block counter 1 | Data: b' / Metadata: h(b') Virtual location 3 Block counter 2 | | 3 | 3 | 6 → 0 <br> 3̶ → 1̶ <br> 3 → 2 |

PHYSICAL LOCATION

RECONSTRUCTED METADATA

400

| 0 | 1 | 2 |
|---|---|---|
| Data: a | Data: b | Data: b' |
| Metadata: h(a) Virtual location 6 Block counter 0 | Metadata: h(b) Virtual location 3 Block counter 1 | Metadata: h(b') Virtual location 3 Block counter 2 |

READ ↓

401

| Data: a | Data: b | Data: b' |
|---|---|---|
| Metadata: h(a) Virtual location 6 Block counter 0 | Metadata: h(b) Virtual location 3 Block counter 1 | Metadata: h(b') Virtual location 3 Block counter 2 |

6 → 0 | B.C. 0

READ ↓

402

| Data: a | Data: b | Data: b' |
|---|---|---|
| Metadata: h(a) Virtual location 6 Block counter 0 | Metadata: h(b) Virtual location 3 Block counter 1 | Metadata: h(b') Virtual location 3 Block counter 2 |

6 → 0 | B.C. 0
3 → 1 | B.C. 1

READ ↓

403

| Data: a | Data: b | Data: b' |
|---|---|---|
| Metadata: h(a) Virtual location 6 Block counter 0 | Metadata: h(b) Virtual location 3 Block counter 1 | Metadata: h(b') Virtual location 3 Block counter 2 |

|  | Physical location 0 | Physical location 1 | Physical location 2 | Head counter | Array Metadata |
|---|---|---|---|---|---|
| Drive 0 | Data: a<br>h(a)<br>V.L. 6<br>B.C. 0<br>S.I. 0 | Parity: cd<br>h(cd)<br>B.C. 5<br>S.I. 1<br>2:(1,1)<br>4:(2,1) |  | 2 | 6̶ : (0, 0)<br>3 : (1, 0)<br>2 : (1, 1)<br>4 : (2, 1) |
| Drive 1 | Data: b<br>h(b)<br>V.L. 3<br>B.C. 1<br>S.I. 0 | Data: c<br>h(c)<br>V.L. 2<br>B.C. 3<br>S.I. 1 |  |  |  |
| Drive 2 | Parity: ab<br>h(ab)<br>B.C. 2<br>S.I. 0<br>6:(0,0)<br>3:(1,0) | Data: d<br>h(d)<br>V.L. 4<br>B.C. 4<br>S.I. 1 |  |  |  |

← 602

|  | Physical location 0 | Physical location 1 | Physical location 2 | Head counter | Array Metadata |
|---|---|---|---|---|---|
| Drive 0 | Data: a<br>h(a)<br>V.L. 6<br>B.C. 0<br>S.I. 0 | Parity: cd<br>h(cd)<br>B.C. 5<br>S.I. 1<br>2:(1,1)<br>4:(2,1) | Data: b'<br>h(b')<br>V.L. 3<br>B.C. 7<br>S.I. 2 | 3 | 6̶ ̶:̶ ̶(̶0̶,̶ ̶0̶)̶<br>3̶ ̶:̶ ̶(̶1̶,̶ ̶0̶)̶<br>2 : (1, 1)<br>4 : (2, 1)<br>6 : (2, 2)<br>3 : (0, 2) |
| Drive 1 | Data: b<br>h(b)<br>V.L. 3<br>B.C. 1<br>S.I. 0 | Data: c<br>h(c)<br>V.L. 2<br>B.C. 3<br>S.I. 1 | Parity: a'b'<br>h(a'b')<br>B.C. 8<br>S.I. 2<br>6:(2,2)<br>3:(0,2) |  |  |
| Drive 2 | Parity: ab<br>h(ab)<br>B.C. 2<br>S.I. 0<br>6:(0,0)<br>3:(1,0) | Data: d<br>h(d)<br>V.L. 4<br>B.C. 4<br>S.I. 1 | Data: a'<br>h(a')<br>V.L. 6<br>B.C. 6<br>S.I. 2 |  |  |

METHODS OF ADMINISTERING METADATA FOR PERSISTENT STORAGE DEVICE

CROSS-REFERENCE TO RELATED APPLICATIONS

This application is a non-provisional of U.S. Provisional Application No. 63/292,044, filed Dec. 21, 2021, having the same title, herein incorporated by reference in its entirety for all purposes.

FIELD OF THE INVENTION

This relates to methods of administering metadata for a persistent storage device.

BACKGROUND

Data may be stored on one or more persistent storage devices, such as a hard drive or an array of hard drives. The one or more storage devices can have multiple physical locations. Data may be stored at physical locations of the one or more storage devices. Virtual locations may be mapped to a physical location of the one or more storage devices.

SUMMARY OF THE INVENTION

In a first example, there is provided a method comprising: receiving a request to write data at a virtual location; writing the data to a physical location on a persistent storage device, and writing metadata to the physical location, wherein the metadata comprises: the virtual location; and a counter.

In a second example, the first example is provided wherein the counter is a block counter.

In a third example, the first example is provided wherein the counter is a stripe index counter.

In a fourth example, the first example is provided wherein the counter is monotonically increasing.

In a fifth example, the first example is provided wherein the data is a block of a stripe.

In a sixth example, the first example is provided wherein the data is parity data.

In a seventh example, the fifth example is provided wherein the metadata correlates a virtual location with a physical location of a block of a stripe.

In an eighth example, there is provided a method of reconstructing metadata for a storage device, the method comprising reading metadata stored at a physical location of a storage device, reading a virtual location within the metadata, determining whether a reconstructed metadata for the storage device includes a mapping between the virtual location and a physical location, reading a counter within the metadata stored at the physical location if the reconstructed metadata for the storage device does include a mapping between the virtual location and a physical location, and optionally updating the reconstructed metadata for the storage device.

In a ninth example, the eighth example is provided wherein the counter is a stripe index counter.

In a tenth example, the eighth example is provided wherein the counter is a block counter.

In an eleventh example, there is provided a method of reconstructing metadata for an array of storage devices, the method comprising: reading metadata stored at a physical location of the array of storage devices, reading a virtual location within the metadata, determining whether a reconstructed metadata for the array of storage devices includes a mapping between the virtual location and a physical location, reading a counter within the metadata stored at the physical location if the reconstructed metadata for the array of storage devices does include a mapping between the virtual location and a physical location, and optionally updating the reconstructed metadata for the array of storage devices.

In a twelfth example, the eleventh example is provided further comprising reading parity metadata stored at a physical location of the array of storage devices, accessing a stripe mapping within the parity metadata, and reading a stripe index counter associated with the stripe mapping.

In a thirteenth example, the eleventh example is provided further comprising: reading parity metadata stored at a physical location of the array of storage devices, accessing a stripe mapping within the parity metadata, reconstructing a block of a stripe, and updating the reconstructed metadata for the array of storage devices using the stripe mapping within the parity metadata.

BRIEF DESCRIPTION OF THE DRAWINGS

The description is framed by way of example with reference to the drawings which show certain embodiments. However, these drawings are provided for illustration only, and do not exhaustively set out all embodiments.

FIG. 2 shows a worked example of a storage controller writing data and metadata.

FIG. 2 shows a worked example of a storage controller writing data and metadata to a persistent storage device.

FIG. 4 shows a worked example of metadata being reconstructed.

FIGS. 6A and 6B show a worked example of a storage controller writing data and metadata to an array of persistent storage devices.

DETAILED DESCRIPTION

In some examples, there is provided a method for a storage controller to receive a request to write data at a virtual location, writing data at the next free physical location in sequence, writing metadata correlating the virtual location with the physical location at the physical location, and writing a counter at the physical location. The recorded metadata can be used to reconstruct the mapping between a given physical location and its corresponding virtual location if the virtual block address is somehow lost. The recorded counter can be used to determine the most recently recorded mapping between the virtual location and physical location, thereby resolving any discrepancies between earlier recorded metadata.

In this case, "next" may refer to the next block in a sequence of blocks. The sequence may be determined based on the configuration of the particular persistent storage device. For example, "next" may be based, at least in part, on the block having the lowest expected seek time from the current block.

This method may be implemented via a storage controller. The storage controller may provide a functionality to write data, read data, and update data. In this way, the drive provides all the necessary functionality for a block device, such as a persistent storage device. In particular, the storage controller may be a userspace application which receives system calls from a kernel module and in turn writes data to the underlying persistent devices.

Writing to a Storage Device

Figure 1:
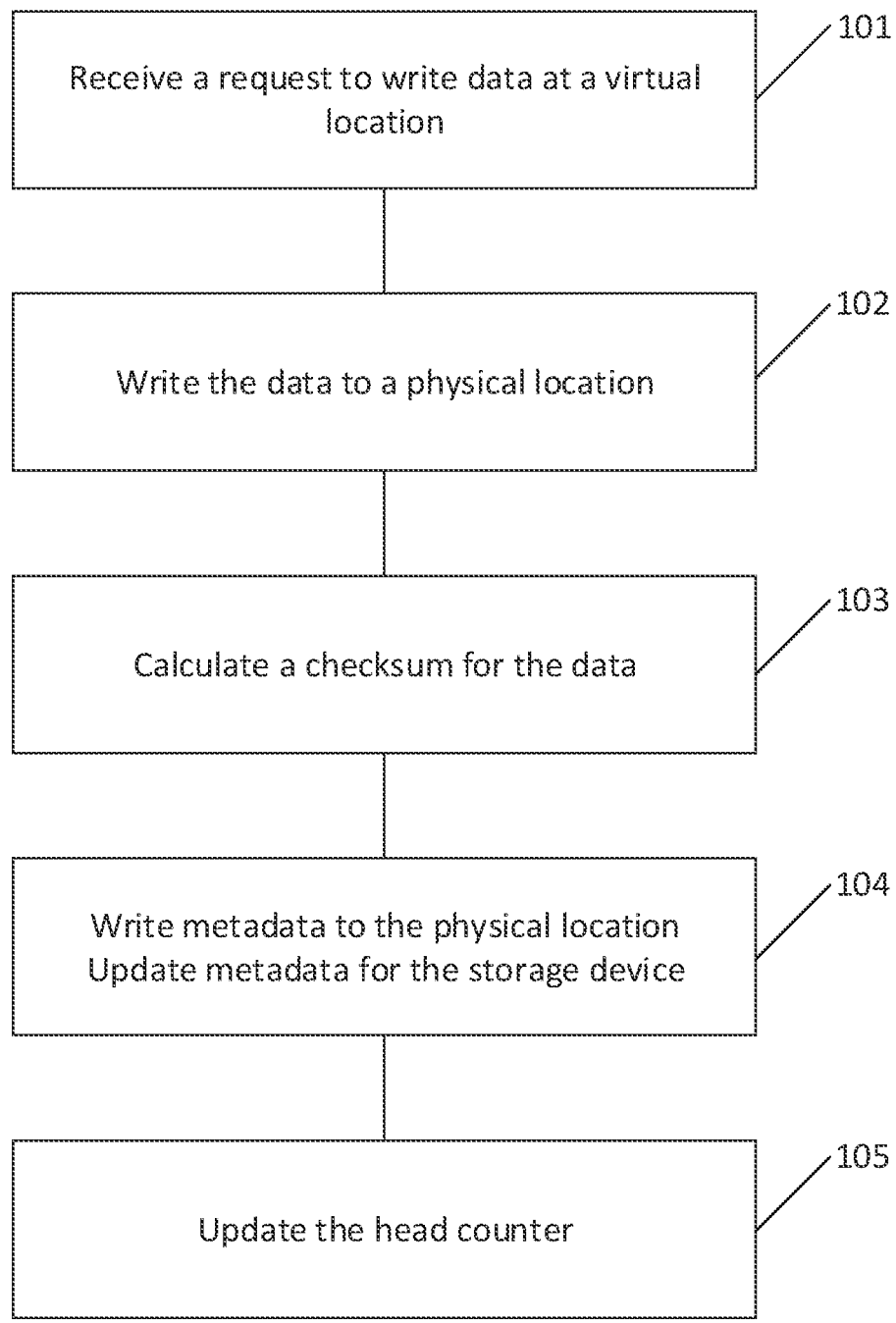
FIG. 1 shows an example approach of a storage controller handling a write request to a persistent storage device.

FIG. 1 shows an example approach for the storage controller handling a write request to a persistent storage device, such as a hard drive. This may be implemented in a storage controller running on a system.

At step 101, a request is received to write data at a first location of the persistent storage device. The request may be received by a function call of the storage controller. The request may comprise the data or may comprise a pointer to where the data may be retrieved from (for example, a memory address).

The first location is a virtual location, since it may not correspond to a physical location on a persistent device. However, the first location is structured as if it were a physical location, since the redirection by the storage controller is hidden from a user of the storage controller. The request may therefore comprise an identifier of the first location, such as a block index and disk identifier. A subsequent request to read the data from the virtual location should therefore return the same data irrespective of the physical location of the data.

In some cases, the data may be part of a stream of data A request to write data is therefore received (or treated as being received) for each block in the stream.

At step 102, the data is written to a second location. The second location is a physical location which corresponds to a block on the persistent storage device. However, this may be different from any block indicated by the virtual location.

In particular, the second location may be a head of the persistent storage device, that is, the next free block of the persistent storage device or a sequence of next free blocks of the persistent storage device. This can be recorded at the persistent storage device by a head counter which records the index of the next free block of the persistent storage device. A free block is a block in which no data is stored, or if data is stored, there is no need for that data to be retrievable. In this way, the block is appended to the sequence of blocks which have already been written.

By writing to a next free block (which, by definition, is free), there is no need to determine whether the data at the indicated block has changed. This avoids the need to initially read from the block, and therefore can result in improved performance.

Moreover, because the physical location need not directly correspond with the virtual location, there is no need for the requestor (such as a program) to determine where the next free block is to achieve this. The function of a location as a label to retrieve data is decoupled from the function of a location as a mechanism for managing a persistent storage device. These functions are performed by the virtual location and the physical location respectively.

At step 103, a checksum for the data at the block indicated by the physical location is calculated. The checksum may be a cryptographic hash. This can be used to verify that data subsequently retrieved from the block is the same as the data stored at the block. In some cases, the checksum may comprise parity information which can correct some errors in the block.

At step 104, metadata is written to the physical location. The metadata comprises a mapping from the physical location to the virtual location. The metadata also comprises a counter and the hash calculated at step 103. Metadata for the storage device may also be updated. The metadata for the storage device may also comprise a checksum. The checksum may be a cryptographic hash.

The metadata for the storage device comprises a mapping from the virtual location to the physical location. This links the virtual location (which the requestor or another process can use to indicate the intended data to be retrieved) to the physical location (where the actual data is stored). The metadata for the storage device may also further comprise the checksum for each block.

The metadata written to the physical location comprises a mapping from the physical location to the virtual location specified by the request of the storage controller. This links the physical location (where the actual data is stored) to the virtual location that was specified by the storage controller at the time of the write request. The mapping between the physical location and the virtual location specified by the storage controller can then be reconstructed even if the metadata for the storage device is completely lost. The size of the metadata may be 4 bytes. It will be large enough to accommodate the full range of counter values and virtual addresses or locations associated with the storage device.

The counter that is written to the physical location can be used to determine the recency of the metadata mapping the physical location to the virtual location, as described in more detail herein. The counter is preferably monotonically increasing or decreasing. The counter may roll to an initial value once it exceeds a predetermined threshold. The counter can be or can act as a timestamp or a derivative of a timestamp. The counter may also be used for encryption purposes.

The metadata for the storage device may be stored on the persistent storage device. For example, this may be a predetermined part of the persistent storage device. Additionally or alternatively, the metadata is stored on a separate persistent storage device which may be optimized for use as a cache.

In some cases, the metadata for the storage device may be updated on the basis of individual blocks Updating metadata for the block comprises determining if metadata for the block already exists. If it exists, the original metadata for the block may be replaced by new metadata for the block. This can prevent the metadata for the storage device from having multiple entries for the same data. The physical location corresponding to the previous location may be marked as dirty, indicating that it is free to be written over.

At step 105, the head counter is updated to reflect the next free block.

This may comprise incrementing the head counter to the next block in the sequence of blocks of the persistent storage device (or wrapping around to the first block, once the final block has been reached). However, in some cases, certain blocks may be skipped (for example, if they correspond to faulty portions of the persistent storage device or if the persistent storage device is missing).

Example of Writing to Storage Device

FIG. 2 shows a worked example of how the approach shown in FIG. 1 can be used to write a stream of data to a persistent storage device. In FIG. 2, the storage controller writes data to a single persistent storage device (such as a hard drive).

At 200, the system is shown in its initial state. The head counter indicates physical location 0 as the next free location to be written to. The block counter is 0. The metadata for the storage device is initially empty.

At 201, the storage controller receives a request to write data a to virtual location 6. The storage controller writes the following to physical location 0:
  a. Data a, and
  b. Metadata comprising:
    i. Checksum h(a)
    ii. Virtual location 6
    iii. Block counter 0

The metadata for the storage device is updated to map virtual location 6 to physical location 0. The head counter is incremented to physical location 1. The block counter is incremented to 1.

At 202, the storage controller receives a request to write data b to virtual location 3. Because the head counter indicates physical location 1 as the next free block, the following is written to physical location 1:
  a. Data b, and
  b. Metadata comprising:
    i. Checksum h(b)
    ii. Virtual location 3
    iii. Block counter 1

The metadata for the storage device is updated to map virtual location 3 to physical location 1. The head counter is incremented to physical location 2. The block counter is incremented to 2.

At 203, the storage controller receives a request to write data b' to virtual location 3. Because the head counter indicates physical location 2 as the next free block, the following is written to physical location 2:
  a. Data b', and
  b. Metadata comprising:
    i. Checksum h(b')
    ii. Virtual location 3
    iii. Block counter 2

The metadata for the storage device is updated to show that virtual location 3 is now mapped to physical location 2. The previous mapping between virtual location 3 and physical location 1 is erased from the metadata for the storage device. The head counter is incremented to physical location 3. The block counter is incremented to 3.

This example demonstrates how the metadata for the storage device is updated as data is sequentially written to physical locations. The mapping between a virtual location and its corresponding physical location is also written to each physical location.

Recovering Metadata for a Storage Device after Complete Loss

The metadata that is written to each physical location can be used to recover the metadata for the storage device even if the metadata for the storage device has been completely lost. The recovery process is performed iteratively for each physical location of the storage device. The counter written to the metadata within each physical location is used to determine which of the recorded mappings to a given virtual location is the most recent.

Figure 3:
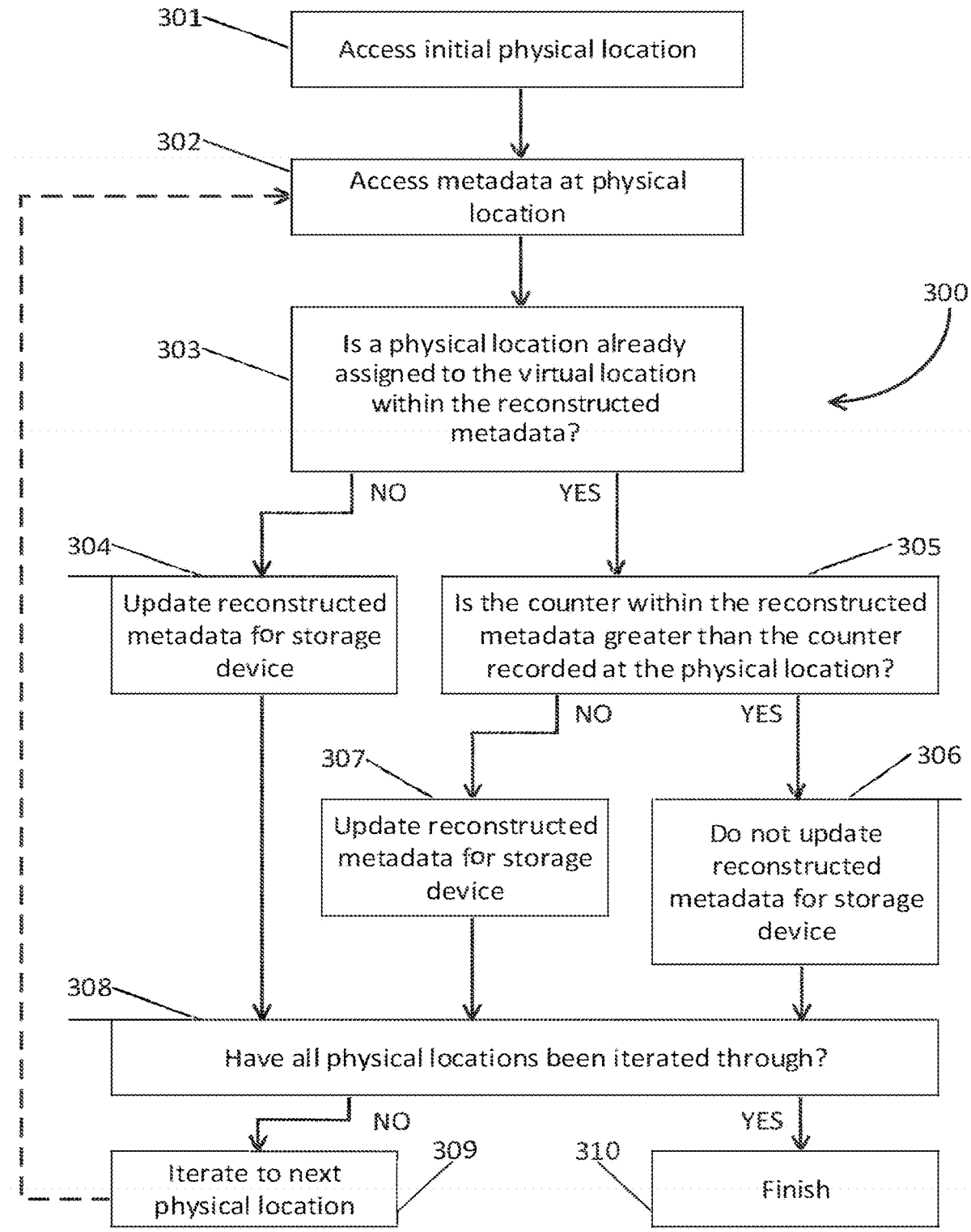
FIG. 3 shows an example approach to reconstructing metadata.

FIG. 3 depicts a method 300 of recovering the metadata for a storage device. An initial physical location is accessed at 301. The initial physical location will typically be physical location 0 (or in other words, the 'first' physical location) although this is not strictly necessary.

The metadata recorded at the physical location is accessed at 302. The portion of the metadata comprising the mapping from the physical location to the virtual location is read. This portion of the metadata corresponds to the mapping between the recorded virtual location and the physical location at the time when the data and metadata was written to the physical location. In other words, the metadata written at the physical location corresponds to a complementary portion of the lost metadata for the storage device, although this may not be up to date.

Reconstructed metadata for the storage device is accessed at 303. A check is made to determine whether a physical location has been assigned to the virtual location that is recorded within the metadata at the physical location. If no value has been assigned to the virtual location, the reconstructed metadata for the storage device is updated at 304 to map the virtual location to the physical location. The reconstructed metadata is also updated to record the block counter that is written within the metadata at the physical location. The process then proceeds to 308.

Conversely, if the reconstructed metadata for the storage device already includes a mapping from the virtual location in question to another physical location, then the associated block counter stored alongside the mapping within the reconstructed metadata for the storage device is compared against the counter within the metadata written to the physical location, as shown at 305.

If the block counter within the reconstructed metadata is greater than the block counter written to the physical location, then the mapping from the virtual location within the reconstructed metadata is more recent than the mapping recorded within the metadata of the physical location. The reconstructed metadata is therefore not updated, as at 306, and the method proceeds to 308.

If the block counter within the reconstructed metadata is less than the block counter written to the physical location, then the mapping from the virtual location within the reconstructed metadata is less recent than the mapping recorded within the metadata of the physical location. The reconstructed metadata is then updated at 307 to include the mapping between the virtual location and the physical location as recorded within the metadata written at the physical location. The reconstructed metadata is also updated to include the block counter that is written to the physical location. The method then proceeds to 308.

A check is made at 308 as to whether all of the physical locations of the storage device have been iterated through. The method iterates to the next physical location at 309 if one or more are still available and the method repeats at 302. The method finishes at 310 if all the physical locations of the storage device have been iterated through. The reconstructed metadata for the storage device is then complete and can be used by the storage controller to map virtual locations to the physical locations of the storage device.

Example of Recovering Metadata for a Storage Device After Complete Loss

FIG. 4 shows a worked example of a method of recovering metadata for a storage device. The particular storage device considered in this worked example is the same storage device used to illustrate the writing of data in FIG. 2.

The storage device is shown in its initial state at 400. The first three physical locations of the storage device include data and metadata. The reconstructed metadata for the storage device is empty.

Physical location 0 is accessed at 401. The metadata stored at physical location 0 is accessed and the stored virtual location 6 is checked against the reconstructed metadata for the storage device. The reconstructed metadata does not comprise a physical location recorded against virtual location 6 as the reconstructed metadata is initially empty. The reconstructed metadata is updated to map virtual location 6 to physical location 0 and to store the associated block counter (which has a value of 0 in this case).

Physical location 1 is then accessed at 402. The metadata stored at physical location 1 is accessed and the stored virtual location 3 is checked against the reconstructed metadata for the storage device. The reconstructed metadata does not comprise a physical location recorded against virtual location 3. The reconstructed metadata is therefore updated to map virtual location 3 to physical location 1 and to store the block counter value of 1.

Physical location 2 is then accessed at 403. The metadata stored at physical location 2 is accessed and the stored virtual location 3 is checked against the reconstructed metadata for the storage device.

The reconstructed metadata already includes a mapping between virtual location 3 and physical location 1. The mapping stored within the metadata at physical location 2 therefore disagrees with the reconstructed metadata for the storage device. A discrepancy therefore arises.

To resolve the discrepancy, the block counter within the metadata at physical location 2 is compared with the block counter that is associated with virtual location 3 and stored within the reconstructed metadata for the storage device. In this case, the block counter stored within physical location 2 has a value of 2 while the counter associated with virtual location 3 that is stored within the reconstructed metadata for the storage device has a value of 1. The block counter stored within physical location 2 is therefore greater than the block counter associated with virtual location 3 and stored within the reconstructed metadata for the storage device. This signifies that the mapping stored within the metadata is more recent than the mapping stored within the reconstructed metadata for the storage device.

The reconstructed metadata for the storage device is therefore updated at 404 to reflect the more up-to-date mapping between virtual location 3 and physical location 2. The block counter stored at physical location 2 is also stored within the reconstructed metadata.

The process then concludes. The end result is a reconstructed metadata for the storage device that represents the most recent mappings between the virtual locations and the physical locations of the storage device. It will be seen by inspection that the reconstructed metadata for the storage device is equivalent to the metadata for the storage device at 203 in FIG. 2

Writing to an Array of Storage Devices

A similar approach can be used to write data as a stripe across an array of persistent storage devices. In this way, a subset of the devices can be used for data and the remaining devices can be used for parity.

During configuration, the storage controller may be configured to have a particular resilience. Data can be stored in stripes that are distributed among an array of a persistent storage devices Each stripe comprises n blocks in total, each of which are stored on a separate storage device within the array of n storage devices. Within each stripe, k of the n blocks include data and m of the n blocks are parity, such that n=k+m. Consequently, the data stored within a stripe can be recovered if any k of the blocks within the stripe are available, regardless of whether the k blocks are data or parity information. One common arrangement is 8+2 parity, wherein each stripe includes 8 blocks of data and 2 blocks of parity. However, any value for k and in may be used depending on the application of the array of persistent storage devices.

One approach for generating the parity data in such a scheme is to use erasure encoding.

The n blocks comprising each stripe are preferably stored in the same indexed physical location on all a persistent storage devices within the array. For example, stripe 0 may consist of the blocks at physical location 0 on every persistent storage device. This can allow the storage controller to maintain a single head counter that is common to all a persistent storage devices.

While a single head counter is described for simplicity, each persistent storage device may maintain a separate head counter. This can allow for garbage collection to occur on one storage device while a write is occurring on another storage device.

It can be useful for subsequent stripes to use different storage devices for parity. This can be arranged by iteratively writing the first block of each new stripe at a subsequent storage device of the array. For example, the first block (i.e. block 0) of stripe 0 may be written to physical location 0 of drive 0, the first block of stripe 1 be written may start to physical location 1 of drive 1, and so on. This will naturally cause the parity blocks (which are written after the data blocks) to be located on different persistent storage devices within the array. Distributing the parity data amongst the n storage devices can increase the resiliency of the entire array.

Figure 5:
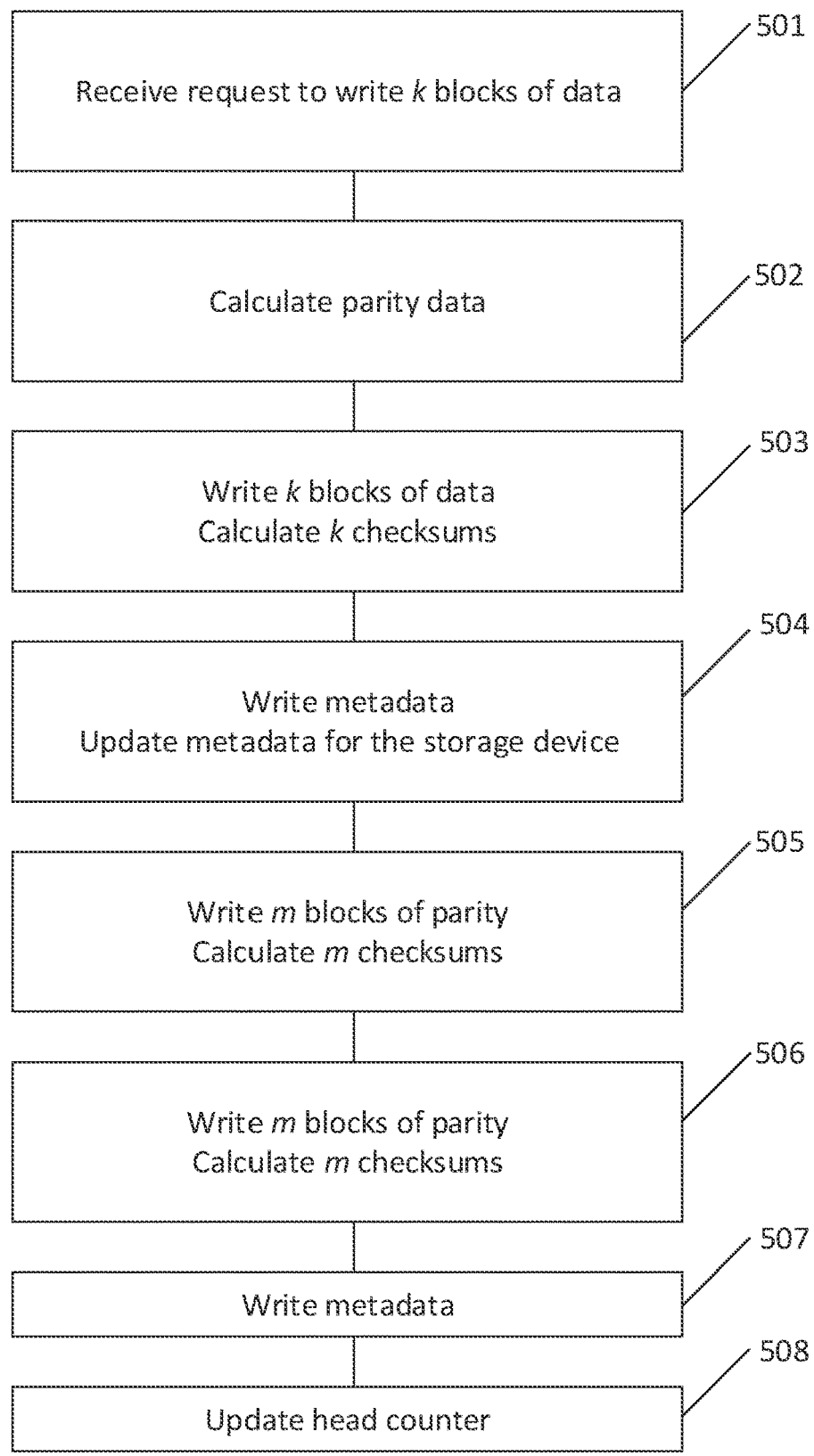
FIG. 5 shows an example approach of a storage controller handling a write request to an array of persistent storage devices.

FIG. 5 shows an example approach for handling a write request where data is to be stored in stripes. This may be implemented by a storage controller running on a system.

At 501, a request to write k blocks of data at k virtual locations is received. The request can correspond to a request received at step 101 of FIG. 1.

At 502, after k data blocks have been received, the storage controller calculates parity data based on the k data blocks that are to be written. This results in m blocks of parity data.

At 503, each of the k blocks of data are written to a corresponding persistent storage device at the physical location indicated by the head counter. A checksum for each of the k blocks of data is calculated. The checksum may be a cryptographic hash for data verification.

At 504, metadata is written to each physical location that contains one of the k blocks of data. The metadata comprises a mapping from that physical location to its corresponding virtual location specified by the request at 501. The metadata further comprises a block counter, the checksum for the associated block that was calculated at 503, and optionally a stripe index counter. Metadata for each storage device of the array and/or metadata for the array of storage devices may also be updated. The metadata for each storage device of the array and/or metadata for the array of storage devices may also comprise a checksum. The checksum may be a cryptographic hash.

The metadata for each storage device and/or metadata for the array of storage devices comprises a mapping from the virtual locations associated with the storage device/array to the physical locations of the storage device/array. This links virtual locations (which the requestor or another process can use to indicate the intended data to be retrieved) to the physical location (where the actual data is stored.) The metadata for the storage device and/or array may also further comprise the checksum for each block of data.

As in the case of a single storage device (described with respect to FIG. 3), the metadata written to each physical location at 504 comprises a mapping from that physical location to the virtual location of the associated block of data specified by the request of the storage controller. This links the physical location (where the actual data is stored) to the virtual location that was specified by the storage controller at the time of the write request. The mapping between the physical location and the virtual location specified by the storage controller can then be reconstructed even if the metadata for the storage device is completely lost.

The size of the metadata may be 4 bits. It will be large enough to accommodate the full range of counter values and virtual addresses or locations associated with the storage device.

Similarly, the block counter that is written to each physical location can be used to determine the recency of the metadata mapping the physical location to the virtual location, as in the case of writing data to a single storage device. The block counter can also be used to determine how recently that block of data was written within its given stripe, as described in more detail below. The block counter is preferably a monotonically increasing counter that is incremented for each block. The value of the block counter that is written to the metadata at each physical location will therefore differ for each of the k blocks.

The stripe index counter can be used to determine how recently a stripe was written to the array of persistent storage devices. It can also be used to associate a set of data blocks with their stripe when reconstructing the metadata for the array of persistent storage devices, as will be described below. Like the block counter, the stripe index counter is preferably a monotonically increasing counter. However, the stripe index counter is only incremented once a given stripe has been completed. The stripe index counter that is written to the metadata at each physical location therefore has the same value for each of the k blocks as all k blocks belong to the same stripe.

At 505, m blocks of parity data are written to corresponding persistent storage devices at the physical location indicated by the head counter. A checksum for each block of parity data is calculated. The checksum may be a cryptographic hash used for data verification.

At 506, metadata is written to each physical location that contains parity data. The metadata comprises the checksum for that block calculated at 505. The metadata can also comprise a mapping from that physical location to its corresponding virtual location if a virtual location is assigned to the block of parity data. The metadata for each parity block can also comprise a unique block counter and a stripe index counter. The stripe index counter for each parity block will have the same value as the stripe index counter written to the metadata for each of the k blocks of data at 504, as the m parity blocks are part of the same stripe as the k blocks of data.

The metadata for each of the m parity blocks can also comprise a mapping that correlates the physical location of each block of the stripe (i.e. each physical location that was written to at 503) with its corresponding virtual location. In other words, the metadata of each parity block can comprise the virtual locations stored within the metadata written to each of the physical locations at 504. This is possible because the m parity blocks are written after all k data blocks have been written to a physical location and associated with a virtual location. The mapping that is stored within the metadata of each parity block can be used to recover the mapping for any block of the stripe that requires reconstruction from any k remaining blocks of the stripe, as described below.

The metadata for the array of persistent storage devices and/or metadata for each persistent storage device may be updated at 507.

At 508, the head counter is updated to reflect the physical location of the next free block at each persistent storage device of the array. Once a block has been written to each persistent storage device at the physical location indicated by the head counter, the head counter may be incremented to the next free location in the sequence. The stripe index counter may be incremented for the next stripe.

Example of Writing to an Array of Storage Devices

Figure 6A:
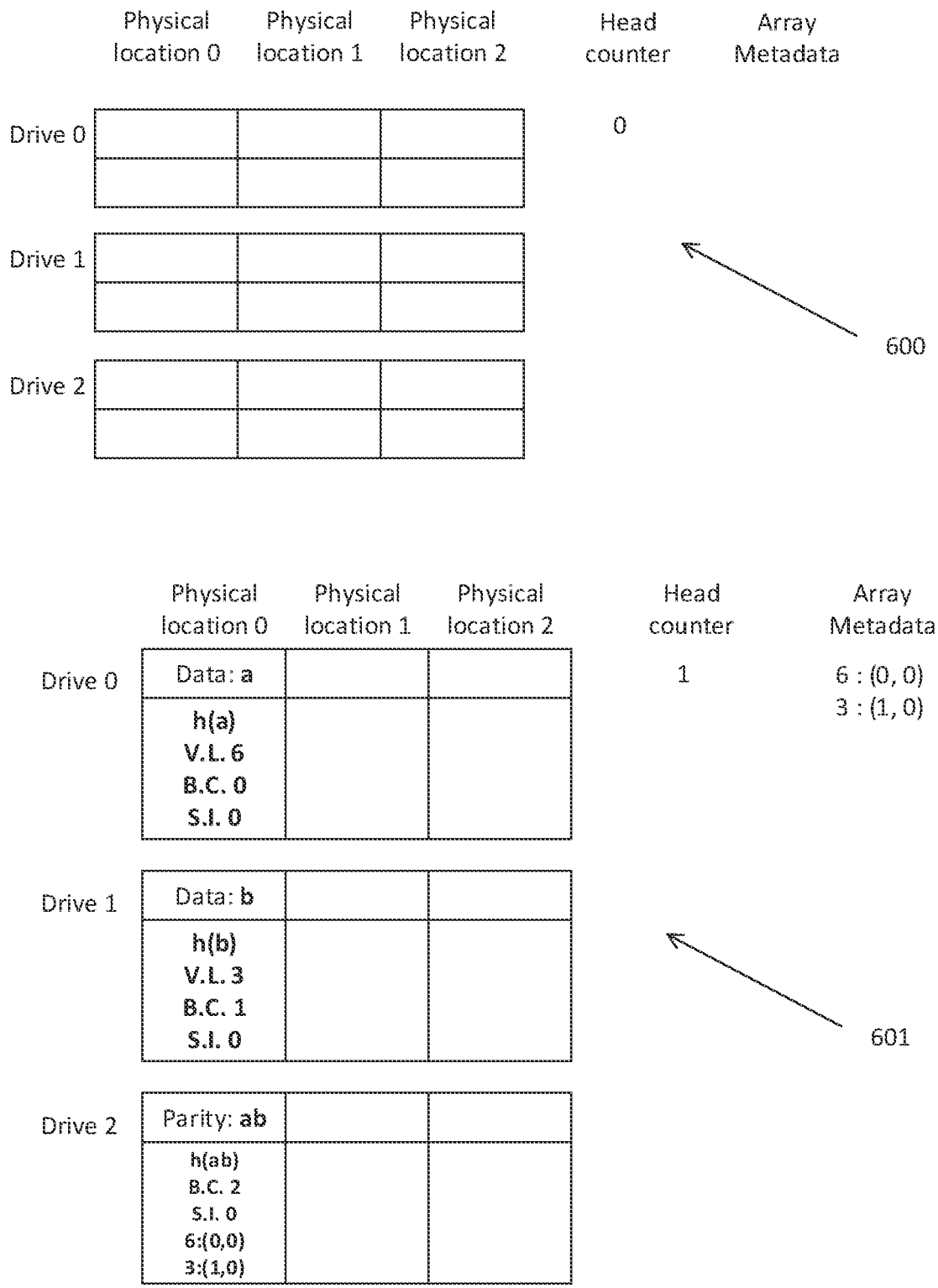

FIGS. 6A and 6B show a worked example of how the approach shown in FIG. 5 can be used to write a stream of data to a persistent storage device. In FIGS. 6A and 6B, the storage controller writes data to an array of three persistent storage devices. In this example, the storage controller is configured to use 2+1 parity (that is, 1 block of parity for every 2 blocks of data.)

The array is shown in its initial state at 600. The head counter indicates physical location 0 as the next free location to be written to for each persistent storage device. The block counter is 0 and the stripe index counter is 0. The metadata for the array is initially empty. Each of the three individual persistent storage devices are empty.

The storage controller receives a request to write data a to virtual location 6. The storage controller writes the following to physical location 0 (as indicated by the head counter) of drive 0:
  a. Data a, and
  b. Metadata comprising:
    i. Checksum h(a)
    ii. Virtual location (V.L.) 6
    iii. Block counter (B.C.) 0
    iv. Stripe index (S.I.) 0

The metadata for the array of storage devices is updated to map virtual location 6 to drive 0, physical location 0. The block counter is incremented to 1. The head counter is not incremented as the stripe is not completed. The stripe index is not incremented as the stripe is not completed.

The storage controller then receives a request to write data b to virtual location 3. The storage controller writes the following to physical location 0 of drive 1:
  a. Data b, and
  b. Metadata comprising:
    i. Checksum h(b)
    ii. Virtual location 3
    iii. Block counter 1
    iv. Stripe index 0

The metadata is updated to map virtual location 3 to drive 1, physical location 0. The block counter is incremented to 2. The head counter is not incremented as the stripe is not completed. The stripe index is not incremented as the stripe is not completed.

The stripe is then completed at 601 by writing parity data ab to the remaining storage device, which in this case is drive 3. Parity data ab is computed based on data a and b, which may be read from drives 0 & 1 or may be stored in memory. The storage controller therefore writes the following to drive 3, physical location 0:
  a. Parity data ab, and
  b. Metadata comprising:
    i. Checksum h(ab)

ii. Block counter 2
iii. Stripe index 0
iv. Stripe mapping:
   a. (Virtual location 6): (Drive 0, physical location 0)
   b. (Virtual location 3): (Drive 1, physical location 0)

This completes the stripe. The block counter is incremented to 3. The head counter and stripe index counter are both incremented to 1 as the stripe has been completed.

The storage controller receives a request to write data e to virtual location 2. The head counter indicates physical location 1 as the next free space to write to. The stripe index counter is 1, indicating that this is the second stripe to be written. The storage controller writes the following to physical location 1 (as indicated by the head counter) of drive 1 (as indicated by the stripe index counter):
a. Data c, and
b. Metadata comprising:
   i. Checksum h(c)
   ii. Virtual location 2
   iii. Block counter 3
   iv. Stripe index 1

The metadata for the array of storage devices is updated to map virtual location 2 to drive 1, physical location 1. The block counter is incremented to 4. The head counter is not incremented as the stripe is not completed. The stripe index is not incremented as the stripe is not completed.

The storage controller receives a request to write data d to virtual location 4. The storage controller writes the following to physical location 1 of drive 2:
a. Data d, and
b. Metadata comprising:
   i. Checksum h(d)
   ii. Virtual location 4
   iii. Block counter 4
   iv. Stripe index 1

The metadata for the array of storage devices is updated to map virtual location 4 to drive 2, physical location 1. The block counter is incremented to 5. The head counter is not incremented as the stripe is not completed. The stripe index is not incremented as the stripe is not completed.

The stripe is then completed at 602 by writing parity data cd to the remaining storage device, which in this case is drive 0. Parity data cd is computed based on data e and d, which may be read from drives 1 & 2 or may be stored in memory. The storage controller therefore writes the following to drive 0, physical location 1:
a. Parity data cd, and
b. Metadata comprising:
   i. Checksum h(cd)
   ii. Block counter 5
   iii. Stripe index 1
   iv. Stripe mapping:
      a. (Virtual location 2): (Drive 1, physical location 1)
      b. (Virtual location 4): (Drive 2, physical location 1)

This completes the stripe. The block counter is incremented to 6. The head counter and stripe index counter are both incremented to 2 as the stripe has been completed.

The storage controller receives a request to write updated data a' to virtual location 6. The head counter indicates physical location 2 as the next free space to write to. The stripe index counter is 2, indicating that this is the third stripe to be written. The storage controller writes the following to physical location 2 (as indicated by the head counter) of drive 2 (as indicated by the stripe index counter):
a. Data a', and
b. Metadata comprising:
   i. Checksum h(a')
   ii. Virtual location 6
   iii. Block counter 6
   iv. Stripe index 2

The metadata for the array of storage devices is updated to map virtual location 6 to drive 2, physical location 2. The previous mapping for virtual location 6 is overwritten. The block counter is incremented to 7. The head counter is not incremented as the stripe is not completed. The stripe index is not incremented as the stripe is not completed.

The storage controller then receives a request to write updated data b' to virtual location 3. The storage controller writes the following to physical location 2 of drive 0:
a. Data b', and
b. Metadata comprising:
   i. Checksum h(b')
   ii. Virtual location 3
   iii. Block counter 7
   iv. Stripe index 2

The metadata for the array of storage devices is updated to map virtual location 3 to drive 0, physical location 2. The previous mapping for virtual location 3 is overwritten. The block counter is incremented to 8. The head counter is not incremented as the stripe is not completed. The stripe index is not incremented as the stripe is not completed.

The stripe is then completed at 603 by writing parity data a'b' to the remaining storage device, which in this case is drive 1. Parity data a'b' is computed based on data a' and b', which may be read from the drives or may be stored in memory. The storage controller therefore writes the following to drive 1, physical location 2:
a. Parity data a'b', and
b. Metadata comprising:
   i. Checksum h(a'b')
   ii. Block counter 8
   iii. Stripe index 2
   iv. Stripe mapping:
      a. (Virtual location 6): (Drive 2, physical location 2)
      b. (Virtual location 3): (Drive 0, physical location 2)

This completes the stripe. The block counter is incremented to 9. The head counter and stripe index counter are both incremented to 3 as the stripe has been completed.

This example demonstrates how the metadata for the array of storage devices is updated as stripes of data are sequentially written to physical locations of each drive. The mapping between a virtual location and its corresponding physical location is also written to each physical location alongside a block counter and a stripe index counter. In this particular example, the metadata that is written to each parity block includes a mapping of the physical-to-virtual locations for the stripe containing the parity block. This can be used to recover metadata for the array of storage devices as described below.

Recovering Metadata for an Array of Storage Devices after Complete Loss

The metadata that is written to each physical location of each drive can be used to recover the metadata for the array of storage devices even if the metadata for the array of storage devices is completely lost. Furthermore, the metadata that is written to each parity block for each stripe can be used to recover the virtual-to-physical mapping for any data blocks that may have been lost from that stripe and may require reconstruction, provided that reconstruction is possible (i.e. if at least k blocks of the stripe are intact.) The exact process for recovering the metadata for the array of storage devices depends on whether any blocks within the array are missing or cannot be retrieved and, if so, the nature of those missing blocks.

Figure 7:
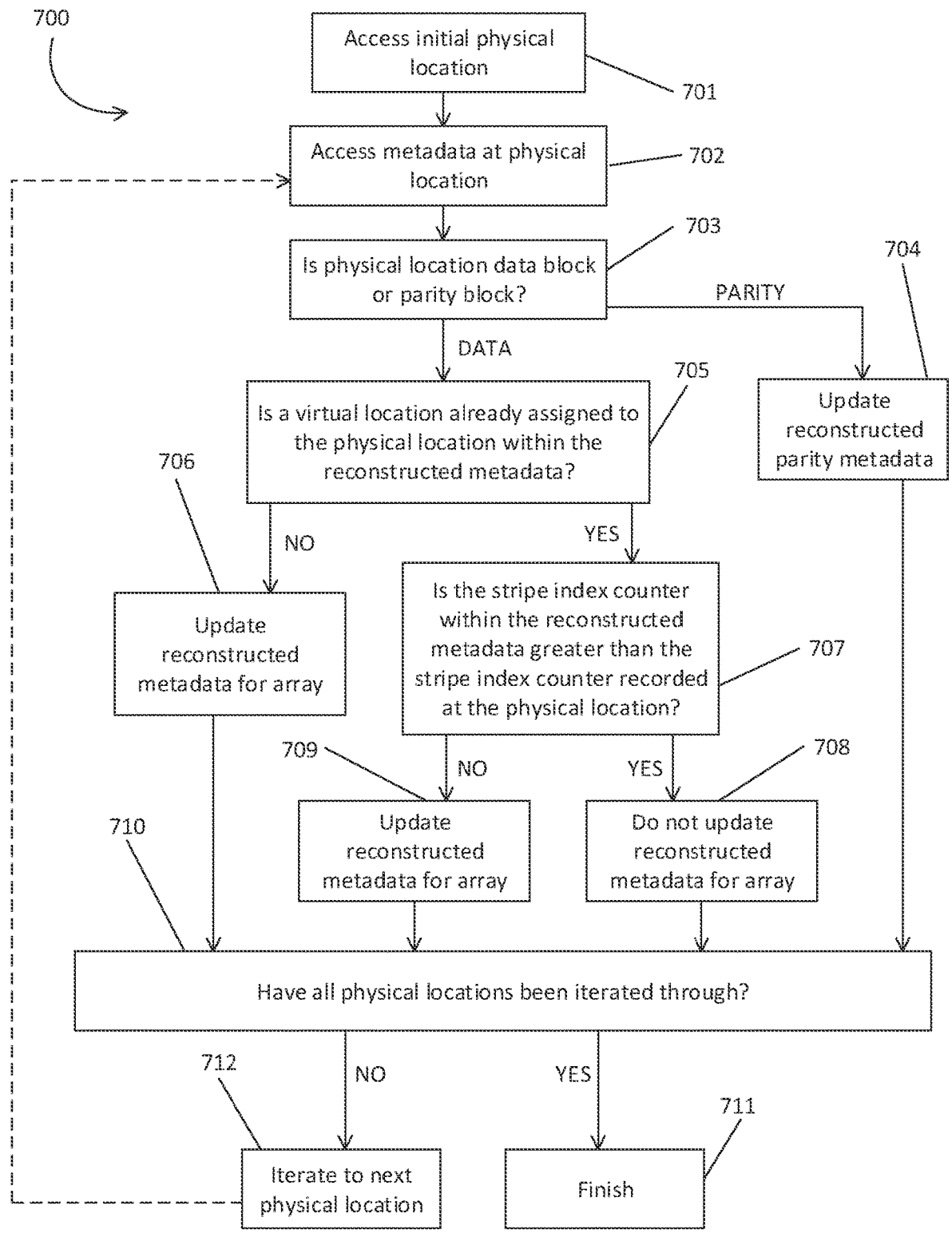
FIG. 7 shows an example approach to reconstructing metadata.

FIG. 7 depicts an example of a method 700 for recovering the metadata for an array of storage devices. An initial physical location is accessed at 701 and the metadata at the physical location is accessed at 702. A determination is made at 703 as to whether the physical location corresponds to a data block or to a parity block. This determination can be made, for example, on the basis of the metadata stored at the physical location. If it is determined that the physical location corresponds to a parity block, the reconstructed parity metadata can be updated at 704 to include the metadata at the physical location (comprising the stripe mapping, stripe index counter, and block counter of the parity block). The method then proceeds to 710

If the physical location accessed at 701 is determined to be a data block, the portion of the metadata comprising the mapping from the virtual location to the physical location is read from the physical location and is compared against the reconstructed metadata for the array of storage devices at 705. This is similar to step 302 depicted in FIG. 3.

If the reconstructed metadata for the array of storage devices does not include a mapping from the virtual location stored within the metadata of the accessed physical location to a physical location within the array, the reconstructed metadata is updated to map the virtual location stored within the metadata to the physical location (i.e. the indexed physical location and its associated drive) at 706. The reconstructed metadata for the array is also updated to record the block counter and stripe index counter that are stored within the metadata of the physical location that is being accessed. The method then proceeds to 710.

Conversely, if the reconstructed metadata for the array of storage devices already includes a mapping from the virtual location stored in the metadata to another physical location, then the associated stripe index counter that is stored alongside the mapping within the reconstructed metadata for the array of storage devices is compared against the stripe index counter within the metadata written to the physical location, as shown at 707.

If the stripe index counter for the virtual location that is stored within the reconstructed metadata is greater than the stripe index counter written to the metadata of the physical location, then the mapping from the virtual location within the reconstructed metadata is more recent than the mapping recorded within the metadata of the physical location. The reconstructed metadata for the array of storage devices is therefore not updated, as at 708, and the method proceeds to 710.

If the stripe index counter for the virtual location that is stored within the reconstructed metadata is less than the stripe index counter written to the metadata of the physical location, then the mapping from the virtual location within the reconstructed metadata is less recent than the mapping recorded within the metadata of the physical location. The reconstructed metadata for the array of storage devices is then updated at 709 to include the mapping between the virtual location and the physical location as recorded within the metadata written at the physical location. The reconstructed metadata for the array of storage devices is also updated to record the stripe index counter and the block counter that are written to the metadata of the physical location. The method then proceeds to 710

If the stripe index counter for the virtual location stored within the reconstructed metadata has the same value as the stripe index counter written to the metadata of the physical location, then the block counter for the virtual location within the reconstructed metadata can be compared against the block counter written to the metadata of the physical location to determine which mapping is more recent (not pictured). The metadata is then either updated or is not updated and the method proceeds to 710.

A check is made at 710 to determine whether all physical locations have been iterated through. If all physical locations have been accessed then the reconstruction finishes at 711. Otherwise, the next physical location is iterated to at 712. Recovering Metadata when Physical Locations are Inaccessible Reconstruction of the metadata for an array of storage devices is straightforward if all physical locations of the array that contain data are accessible. In this case, the metadata written to each physical location of each drive in the array can be directly accessed and the metadata for the entire array can be updated depending on the value of stripe counter and/or block counter written to each physical location. This is similar to the worked example depicted in FIG. 4, except that a storage devices (rather than a single storage device) are iterated through. This process is not substantially affected even if parity blocks from a given stripe are inaccessible, provided that all mappings written to the metadata of each data block are accessible.

However, the reconstruction of the metadata for the array is complicated if some data blocks are inaccessible. For example, consider FIG. 8. This shows the reconstruction of metadata for the same array that is depicted in FIG. 6B. However, physical location 2 of drive 0 and physical location 1 of drive 1 are both inaccessible in this example.

Physical location 0 of drives 1, 2, and 3 are accessed at 801, 802, and 803. The reconstructed metadata for the array is updated to map virtual location 6 to drive 0, physical location 0 based on the metadata accessed at 801, alongside the recorded stripe index counter and block counter. The reconstructed metadata for the array is updated to map virtual location 3 to drive 1, physical location 0 based on the metadata accessed at 802, alongside the recorded stripe index counter and block counter. The reconstructed parity data is updated to include the mapping and metadata stored at drive 2, physical location 0 at 803, alongside the recorded stripe index counter and block counter. The reconstructed metadata for the array and reconstructed parity metadata are shown at 810 after physical location 0 has been iterated through for each drive.

Physical location 1 of drives 0, 1, and 2 are accessed at 804, 805, and 806. The reconstructed parity data is updated to include the mapping stored at drive 0, physical location 1 at 804 alongside the stripe index counter and block counter. Drive 1, physical location 1 is recorded as being inaccessible at 805. The reconstructed metadata for the array is updated to map virtual location 4 to drive 2, physical location 1 at 806. The reconstructed metadata for the array and reconstructed parity metadata are shown at 820 after physical location 1 has been iterated through for each drive.

Physical location 2 of drives 0, 1, and 2 are accessed at 807, 808, and 809. Drive 0, physical location 2 is recorded as being inaccessible at 807. The reconstructed parity data is updated to include the mapping stored at drive 1, physical location 2 alongside the relevant stripe index counter and block counter at 808.

At 809, the metadata of drive 2, physical location 2 is accessed. This maps to virtual location 6 which is already mapped to drive 0, physical location 0 within the reconstructed metadata for the array. The stripe index counter and/or block counter that is written to the metadata of physical location 2 is compared against the recorded stripe index counter and block counter associated with the mapping from virtual location 6 within the reconstructed metadata within the array. The comparison suggests that the mapping stored at drive 2, physical location 2 is more recent than the mapping within the reconstructed metadata. The reconstructed metadata for the array is then updated to reflect the more recent mapping. The final reconstructed metadata for the array and reconstructed parity metadata are shown at 830.

It will be seen that the final reconstructed metadata for the array erroneously maps virtual location 3 to drive 1, physical location 0, when in actuality virtual location 3 should map to drive 0, physical location 2. This error is due to the fact that the metadata at drive 0, physical location 2 was inaccessible. Similarly, the final reconstructed metadata for the array does not include a mapping from virtual location 2 to any physical location within the array. This is due to the fact that the metadata at drive 1, physical location 1 was inaccessible.

Figure 9:
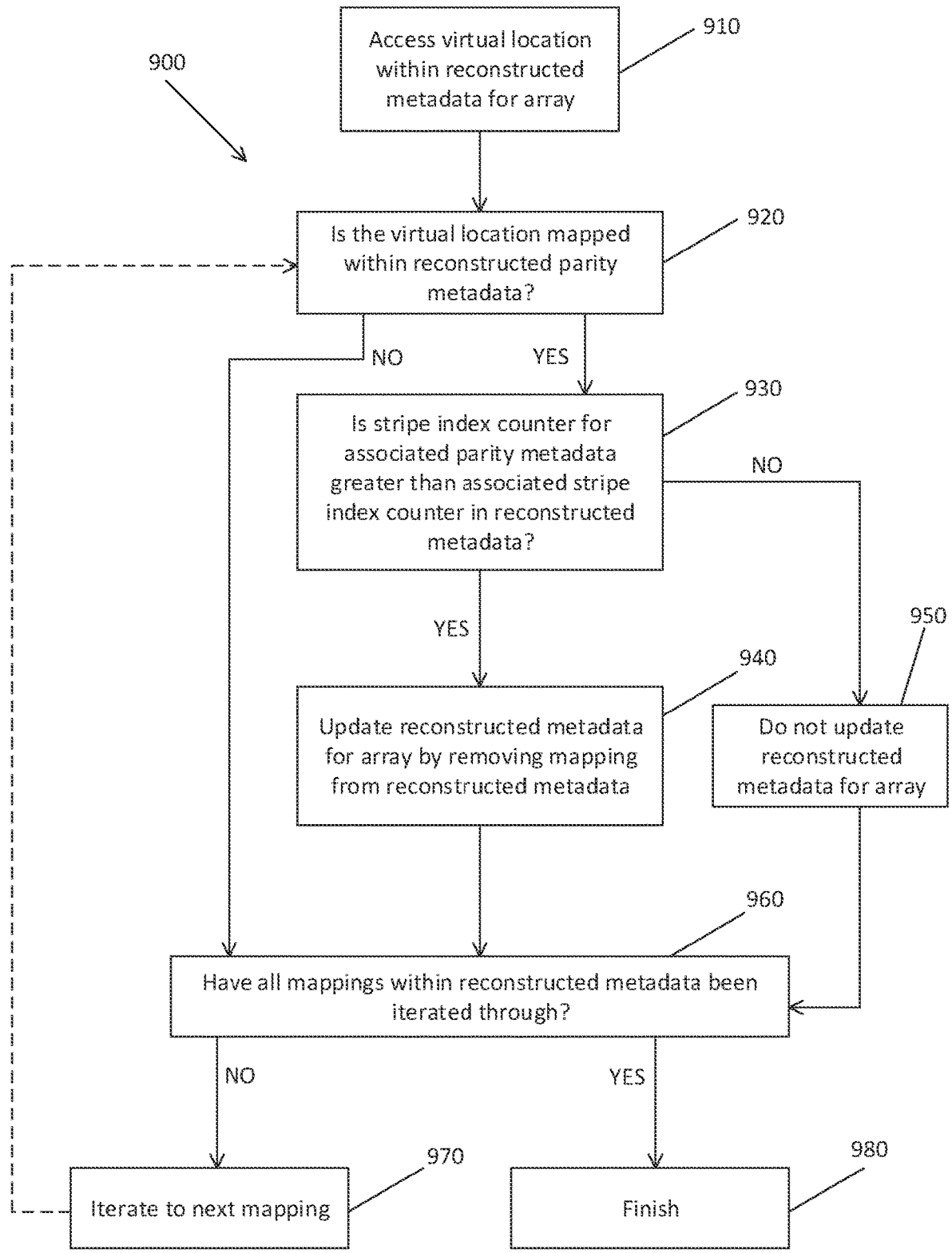
FIG. 9 shows an example approach to updating reconstructed metadata.

FIG. 9 depicts an example of a method 900 of removing erroneous mappings from the reconstructed metadata for the array. A virtual location that is mapped to a physical location within the reconstructed metadata for the array is accessed at 910. A check is made at 920 to determine whether the virtual location is mapped to a physical location within the reconstructed parity metadata. If the virtual location is not mapped within the reconstructed parity metadata then the method proceeds to 960.

If the virtual location is mapped within the reconstructed parity metadata, a check is made at 930 to determine whether the stripe index counter associated with the mapping within the reconstructed parity metadata is greater than the stripe index counter associated with the virtual location within the reconstructed metadata for the array. If the stripe index counter within the reconstructed parity metadata is less than the stripe index counter within the reconstructed metadata for the array, then the mapping within the reconstructed metadata for the array is more recent and is not updated at 950. Conversely, if the stripe index counter within the reconstructed parity metadata is greater than the stripe index counter within the reconstructed metadata for the array, then the mapping within the reconstructed metadata is erroneous. In other words, a more recent mapping to that virtual location exists but was not captured by the reconstruction process. The reconstructed metadata for the array is then updated by removing the mapping of the virtual location, as at 940.

A check is made at 960 as to whether all virtual locations within the reconstructed metadata have been iterated through. The next mapping is iterated through at 970 until all mappings have been iterated through, and the process finishes at 980.

Figure 8:
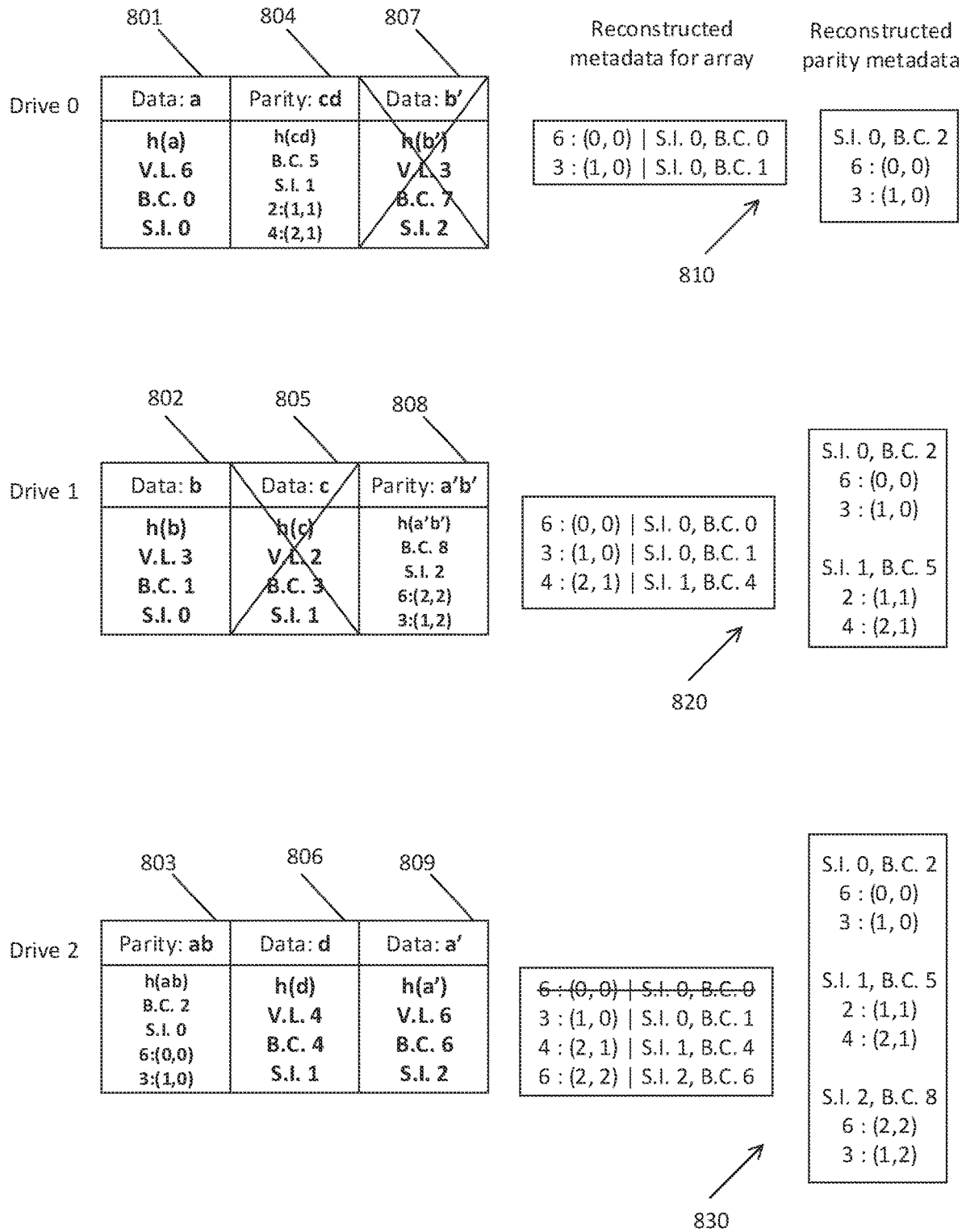
FIG. 8 shows a worked example of metadata being reconstructed.
Figure 10:
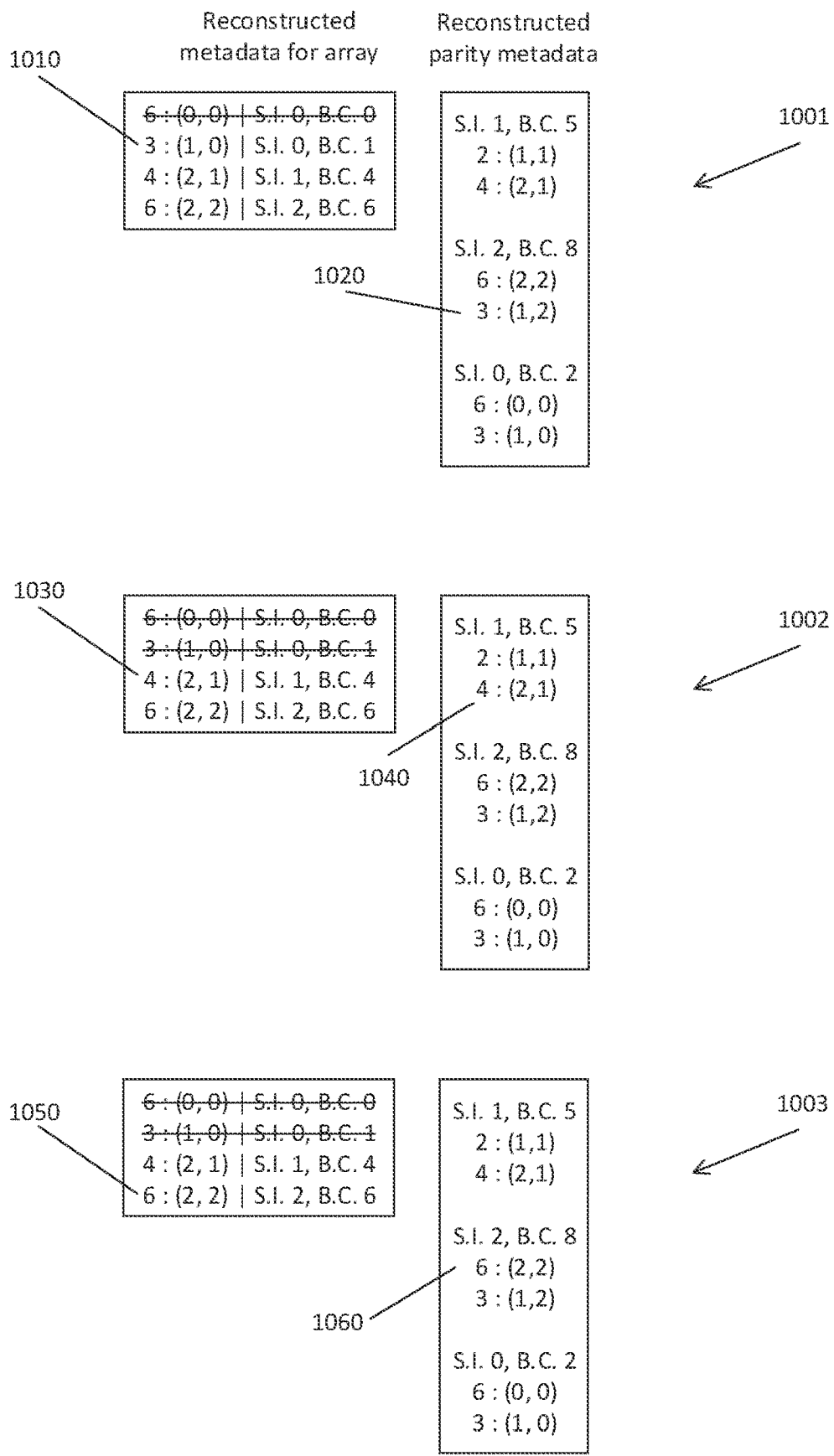
FIG. 10 shows a worked example of an update to reconstructed metadata.

FIG. 10 shows the removal of the erroneous mapping from the reconstructed metadata for the array that is derived in FIG. 8. The completed reconstructed metadata for the array (corresponding to 830 in FIG. 8) is shown at 1001. The reconstructed metadata for the array is accessed and virtual location 3 is read at 1010. Virtual location 3 is mapped to drive 1, physical location 2 in the reconstructed parity metadata at 1020. This reconstructed parity metadata has a stripe index counter of 2 while virtual location 3 has a stripe index counter of 0 within the reconstructed metadata for the array. The mapping within the reconstructed metadata for the array is therefore erroneous and is removed.

Virtual location 4 is then checked at 1030. The only mapping from virtual location 4 within the reconstructed parity metadata is at 1040. The reconstructed metadata for the array and reconstructed parity metadata have the same stripe index counter for virtual location 4, and the reconstructed metadata for the array is therefore not updated.

Virtual location 6 is then checked at 1050. The mapping from virtual location 6 that has the highest stripe index counter within the reconstructed parity metadata is at 1060. The reconstructed metadata for the array and reconstructed parity metadata have the same stripe index counter, and the reconstructed metadata for the array is therefore not updated.

The erroneous mapping from virtual location 3 to drive 1, physical location 0 within the reconstructed metadata for the array has therefore been successfully removed. However, the reconstructed metadata for the array is still missing the correct mapping from virtual locations 2 and 3.

Figure 11:
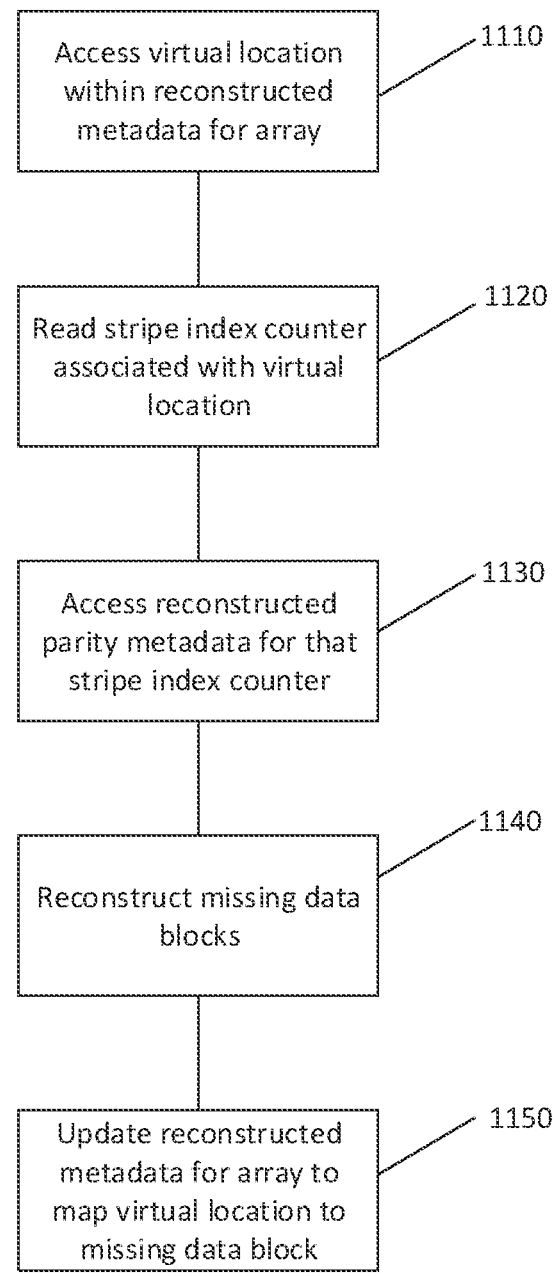
FIG. 11 shows an example approach to updating reconstructed metadata.

FIG. 11 depicts an example of a method for reconstructing missing data blocks from the array and reconstructing their mapping to an appropriate virtual location. This method is performed after erroneous mappings have been removed from the reconstructed metadata for the array (for example, using the method depicted in FIG. 9)

A virtual location that is stored within the reconstructed metadata for the array is accessed at 1110 and its associated stripe index counter is read at 1120. The reconstructed parity metadata for that stripe index counter is then accessed at 1130. The reconstructed parity metadata that is accessed at 1130 includes all of the mappings from each block of the stripe corresponding to the stripe index counter.

The missing data block for that stripe is then reconstructed at 1140 using k blocks from that stripe. The & blocks can be identified as belonging to the same stripe using the stripe index counter. Determining which particular block is missing can be achieved using a number of different ways, e.g. by directly reading the data in accessible blocks, comparing the block counters of accessible blocks, etc. The reconstructed parity metadata for that stripe can also be used to determine which blocks need to be reconstructed and which blocks are available for reconstruction.

The virtual location for the reconstructed block is determined from the reconstructed parity metadata for that stripe, as this includes all mappings for each block of that stripe. The virtual location is written to the metadata of the reconstructed block as has been described above. The stripe counter is not incremented, instead, the reconstructed block is provided with the stripe counter associated with the reconstructed parity data.

The reconstructed metadata for the array is then updated to include the new mapping to the reconstructed block at 1150. If the reconstructed block is written to a different physical location (i.e. other than the physical location and drive of the original block), then the parity block(s) for that stripe may need to be re-written so that the metadata correctly reflects the new mapping of all blocks within the stripe.

Interpretation

A number of methods have been described above. Any of these methods may be embodied in a series of instructions, which may form a computer program. These instructions, or this computer program, may be stored on a computer readable medium, which may be non-transitory. When executed, these instructions or this program cause a processor to perform the described methods. Additionally, or alternatively, any of the methods may be implemented in hardware, for example as an application-specific integrated circuit (ASIC).

Where an approach has been described as being implemented by a processor, this may comprise a plurality of processors. That is, at least in the case of processors, the singular should be interpreted as including the plural. Where methods comprise multiple steps, different steps or different parts of a step may be performed by different processors.

The steps of the methods have been described in a particular order for ease of understanding. However, the steps can be performed in a different order from that specified, or with steps being performed in parallel. This is the case in all methods except where one step is dependent on another having been performed.

The term "comprises" and other grammatical forms is intended to have an inclusive meaning unless otherwise noted. That is, they should be taken to mean an inclusion of the listed components, and possibly of other non-specified components or elements.

While the present invention has been explained by the description of certain embodiments, the invention is not restricted to these embodiments. It is possible to modify these embodiments without departing from the spirit or scope of the invention.

What is claimed is:

1. A method comprising:
   receiving a request to write data at a virtual location;
   writing the data to a physical location on a first persistent storage device;
   writing first metadata to the physical location, wherein the first metadata comprises the virtual location and a counter; and
   writing second metadata to a second persistent storage device, wherein the second metadata comprises a mapping from the virtual location to the physical location.

2. The method of claim 1, wherein the counter is a block counter.

3. The method of claim 1, wherein the counter is a stripe index counter.

4. The method of claim 1, wherein the counter is monotonically increasing.

5. The method of claim 1, wherein the data is a block of a stripe.

6. The method of claim 1, wherein the data is parity data.

7. The method of claim 5, wherein the first metadata correlates the virtual location with the physical location of the block of the stripe.

8. A method of reconstructing metadata for a storage device, the method comprising:
   reading metadata stored at a first physical location of the storage device;
   reading a virtual location within the metadata;
   determining whether a reconstructed metadata for the storage device includes a mapping between the virtual location and a second physical location;
   reading a first counter within the metadata stored at the first physical location if the reconstructed metadata for the storage device includes the mapping between the virtual location and the second physical location; and
   if a second counter within the reconstructed metadata is greater than the first counter, not updating the reconstructed metadata for the storage device, otherwise, updating the reconstructed metadata for the storage device.

9. The method of claim 8, wherein the first counter is a stripe index counter.

10. The method of claim 8, wherein the first counter is a block counter.

11. A method of reconstructing metadata for an array of storage devices, the method comprising:
    reading metadata stored at a first physical location of the array of storage devices;
    reading a virtual location within the metadata;
    determining whether a reconstructed metadata for the array of storage devices includes a mapping between the virtual location and a second physical location;
    reading a first stripe index counter within the metadata stored at the first physical location if the reconstructed metadata for the array of storage devices includes the mapping between the virtual location and the second physical location; and
    if a second stripe index counter within the reconstructed metadata is greater than the first stripe index counter, not updating the reconstructed metadata for the storage device, otherwise, updating the reconstructed metadata for the array of storage devices.

12. The method of claim 11, further comprising:
    reading parity metadata stored at a third physical location of the array of storage devices;
    accessing a stripe mapping within the parity metadata; and
    reading a third stripe index counter associated with the stripe mapping.

13. The method of claim 11, further comprising:
    reading parity metadata stored at a third physical location of the array of storage devices;
    accessing a stripe mapping within the parity metadata;
    reconstructing a block of a stripe; and
    updating the reconstructed metadata for the array of storage devices using the stripe mapping within the parity metadata.

14. The method of claim 1, wherein the first persistent storage device is identical to the second persistent storage device.

15. The method of claim 1, wherein the first persistent storage device is different from the second persistent storage device.

* * * * *